US008396781B2

(12) United States Patent
Moore et al.

(10) Patent No.: US 8,396,781 B2
(45) Date of Patent: Mar. 12, 2013

(54) INTEREST DISSEMINATION PROCESS AND METHOD

(75) Inventors: Brian Moore, Norwalk, CT (US); Kenneth M. Richmond, Fairfield, CT (US); Coleen Erin McGrath, Washington, DC (US)

(73) Assignee: The NASDAQ OMX Group, Inc., New York, NY (US)

( * ) Notice: Subject to any disclaimer, the term of this patent is extended or adjusted under 35 U.S.C. 154(b) by 2836 days.

(21) Appl. No.: 10/206,127

(22) Filed: Jul. 25, 2002

(65) Prior Publication Data

US 2003/0225645 A1    Dec. 4, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2012.01)
(52) U.S. Cl. .............. 705/37; 705/35; 705/36; 705/26
(58) Field of Classification Search ............ 705/35–37, 705/26
See application file for complete search history.

(56) References Cited

U.S. PATENT DOCUMENTS

| 4,412,287 A * | 10/1983 | Braddock, III ................ 705/37 |
| 5,101,353 A * | 3/1992 | Lupien et al. .................. 705/37 |
| 5,297,031 A | 3/1994 | Gutterman et al. |
| 5,297,032 A | 3/1994 | Trojan et al. |
| 6,195,647 B1 | 2/2001 | Martyn et al. |
| 6,272,474 B1 | 8/2001 | Garcia |
| 6,278,982 B1 | 8/2001 | Korhammer et al. |
| 6,408,282 B1 * | 6/2002 | Buist ........................... 705/36 R |
| 6,505,174 B1 * | 1/2003 | Keiser et al. ................ 705/36 R |
| 6,536,935 B2 | 3/2003 | Parunak et al. |
| 6,629,082 B1 | 9/2003 | Hambrecht et al. |
| 6,631,356 B1 | 10/2003 | Van Horn et al. |
| 6,850,907 B2 * | 2/2005 | Lutnick et al. .................. 705/37 |
| 7,020,632 B1 | 3/2006 | Kohls et al. |
| 7,181,424 B1 * | 2/2007 | Ketchum et al. ................ 705/37 |
| 7,209,896 B1 * | 4/2007 | Serkin et al. .................... 705/37 |
| 7,246,092 B1 | 7/2007 | Peterson et al. |

(Continued)

FOREIGN PATENT DOCUMENTS

| WO | WO 91/14231 | 9/1991 |
| WO | WO 98/13778 | 4/1998 |

(Continued)

OTHER PUBLICATIONS

US Patent Application entitled: "Montage for Automated Market System" by Abraham I. Zeigler et al. U.S. Appl. No. 09/401,875, filed Sep. 23, 1999.

(Continued)

*Primary Examiner* — Charles Kyle
(74) *Attorney, Agent, or Firm* — Nixon & Vanderhye P.C.

(57) ABSTRACT

A system to disseminate attributable interest information includes an internal interface that receives attributable interest messages concerning a specific security that is traded on a computerized trading system. Each attributable interest message includes a lot size, a per unit value, and a market participant identifier. An interest grouping process groups the attributable interest messages according to their per unit values, forming a plurality of price level groups. An external interface publishes, over an information bus, the attributable interest messages included in one or more selected price level groups that are chosen from the plurality of price level groups.

33 Claims, 5 Drawing Sheets

U.S. PATENT DOCUMENTS

2002/0082967 A1 6/2002 Kaminsky et al.
2002/0120546 A1* 8/2002 Zajac .............................. 705/37
2002/0161687 A1* 10/2002 Serkin et al. .................... 705/37

FOREIGN PATENT DOCUMENTS

WO WO 01/22313 3/2001

OTHER PUBLICATIONS

"Nasdaq Workstation II", Nasdaq Stock Market, Inc., May 1999, pp. 1-17, XP002171886 (www.nasdaqtrader.com/trader/tradingservices/productsservice6/userguides/- userguides.stm).

"Self Regulatory Organizations: Notice of Filing of Proposed Rule Change by the National Association of Securities Dealers, Inc.," Federal Register—Securities and Exchange Commission, vol. 64, No. 47, Mar. 11, 1999, pp. 12198-12202, XP002171885 (198.17.75.65/fril/).

Reich, Benny and Ben-Shaul, Israel: "A Componentized Architecture for Dynamic Electronic Markets", Sigmod Record, vol. 27, No. 4, Dec. 1998, pp. 40-47, XP002171887 (www.acm.org).

"Self Regulatory Organizations: Notice of Filing of Proposed Rule Change by the National Association of Securities Dealers, Inc.," Federal Register—Securities and Exchange Commission, vol. 64, No. 77, Apr. 22, 1999, pp. 19844-19849, XP002171896 (198.17.75.65/fril/).

NASD Rulemaking: Relating to an Integrated Order Delivery and Execution System Securities and Exchange Commission (Release No. 34-39718; File No. SR-NASD-98-17) Mar. 4, 1998.

Self-Regulatory Organizations; Notice of Filing of Amendment No. 1 to a Proposed Rule Change by National Association of Securities Dealers, Inc., Relating to an Integrated Order Delivery and Execution System Mar. 4, 1998. Federal Register / vol. 63. No. 48 / Thursday, Mar. 12, 1098 / Notices.

Securities and Exchange Commission, Proposed Rule Change, NASD, Inc., Feb. 5, 1999, 61 pps.

* cited by examiner

INTEREST DISSEMINATION PROCESS AND METHOD

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002.

BACKGROUND

This invention relates to electronic securities trading, and more particularly to processing and displaying of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a system to disseminate attributable interest information includes an internal interface that receives attributable interest messages concerning a specific security that is traded on a computerized trading system. Each attributable interest message includes a lot size, a per unit value, and a market participant identifier. An interest grouping process groups the attributable interest messages according to their per unit values, forming a plurality of price level groups. An external interface publishes, over an information bus, the attributable interest messages included in one or more selected price level groups that are chosen from the plurality of price level groups.

One or more of the following features may also be included. A group aggregate value process determines the group aggregate value of each of the selected price level groups. The external interface is configured to publish, over the information bus, the group aggregate value of each selected price level group. A client process receives, from the information bus, the attributable interest messages and group aggregate values published by the external interface.

The client process includes a graphical user display process that displays the attributable interest messages and group aggregate values published by the external interface. The attributable interest messages include ask-side interest messages that represent a lot size of the specific security that is offered for sale by a market participant at an ask price. This ask price is equivalent to the per unit value. The attributable interest messages also include bid-side interest messages that represent a lot size of the specific security that is sought for purchase by a market participant at a bid price, such that the bid price is equivalent to the per unit value.

The graphical user display process include an ask-side display process for displaying, in a multi-column format, an ask-side entry for each ask-side interest message. Each of these ask-side entries includes the market participant identifier, the lot size, and the ask price. The ask-side display process includes a tabular display process for simultaneously displaying multiple ask-side entries in an ask-side table. The ask-side display process further includes a tabular sorting process for sorting the multiple ask-side entries in accordance with their ask price. An ask-side aggregate calculation process generates an ask-side aggregate value for a specific ask-side entry. This ask-side aggregate value is equal to the lot size of the specific ask-side entry summed with the lot sizes of all preceding ask-side entries included in the ask-side table.

The graphical user display process also includes a bid-side display process for displaying, in a multi-column format, a bid-side entry for each bid-side interest message, such that each bid-side entry includes the market participant identifier, the lot size, and the bid price. The bid-side display process includes a tabular display process for simultaneously displaying multiple bid-side entries in a bid-side table. The bid-side display process further includes a tabular sorting process for sorting the multiple bid-side entries in accordance with their bid price. A bid-side aggregate calculation process generates a bid-side aggregate value for a specific bid-side entry, such that the bid-side aggregate value is equal to the lot size of the specific bid-side entry summed with the lot sizes of all preceding bid-side entries included in the bid-side table.

The graphical user display process includes a security selection process that allows a user of the system to select the specific security. A level selection process defines the one or more selected price level groups that are chosen from the plurality of price level groups. The attributable interest messages include quotes and orders.

According to a further aspect of this invention, a method of disseminate attributable interest information includes receiving attributable interest messages concerning a specific security that is traded on a computerized trading system. Each attributable interest message includes a lot size, a per unit value, and a market participant identifier. These messages are grouped according to their per unit values, thus forming a plurality of price level groups. The attributable interest messages included in one or more selected price level groups, which are chosen from the plurality of price level groups, are published over an information bus.

One or more of the following features may also be included. The group aggregate value of each of the selected price level groups is determined, and these group aggregate values are published over the information bus. The attributable interest messages and the group aggregate values that were published by the external interface are received from the information bus. Receiving the attributable interest messages includes displaying the attributable interest messages and group aggregate values published by the external interface. The attributable interest messages include ask-side interest messages that represent a lot size of the specific security that is offered for sale by a market participant at an ask price, such that the ask price is equivalent to the per unit value. The attributable interest messages also include bid-side interest messages that represent a lot size of the specific security that is sought for purchase by a market participant at a bid price, such that the bid price is equivalent to the per unit value.

Displaying the attributable interest messages includes displaying, in a multi-column format, an ask-side entry for each ask-side interest message. Each ask-side entry includes the market participant identifier, the lot size, and the ask price. Further, displaying the attributable interest messages includes displaying, in a multi-column format, a bid-side entry for each bid-side interest message, such that each bid-side entry includes the market participant identifier, the lot size, and the bid price.

Displaying an ask-side entry includes simultaneously displaying multiple ask-side entries in an ask-side table, and sorting the multiple ask-side entries in accordance with their ask price. An ask-side aggregate value is generated for a specific ask-side entry, such that the ask-side aggregate value is equal to the lot size of the specific ask-side entry summed with the lot sizes of all preceding ask-side entries included in the ask-side table.

Displaying a bid-side entry includes simultaneously displaying multiple bid-side entries in a bid-side table, and sorting the multiple bid-side entries in accordance with their bid price. A bid-side aggregate value is generated for a specific bid-side entry, such that the bid-side aggregate value is equal to the lot size of the specific bid-side entry, summed with the lot sizes of all preceding bid-side entries included in the bid-side table.

Displaying the attributable interest messages includes allowing a user of the method to select the specific security to be monitored. The one or more selected price level groups that are chosen from the plurality of price level groups are defined. The attributable interest messages include quotes, and orders.

According to a further aspect of this invention, a computer program product residing on a computer readable medium includes a plurality of instructions. When executed by the processor, these instructions cause that processor to receive attributable interest messages concerning a specific security that is traded on a computerized trading system. Each attributable interest message includes a lot size, a per unit value, and a market participant identifier. These attributable interest messages are grouped according to their per unit values, thus forming a plurality of price level groups. The attributable interest messages, that are included in one or more selected price level groups chosen from the plurality of price level groups, are published over an information bus.

One or more of the following features may also be included. The computer program product further includes instructions to determine the group aggregate value of each of the selected price level groups, such that the group aggregate value of each selected price level group is published over the information bus. The computer program product further includes instructions to receive, from the information bus, the attributable interest messages and group aggregate values published over the information bus. The instructions to receive the attributable interest messages further includes instructions to display the attributable interest messages and group aggregate values published over the information bus.

According to a further aspect of this invention, a message feed for disseminating attributable interest information includes a plurality of attributable interest messages broadcast onto a distributed computing network. These messages includes a lot size (e.g., a quote size), a per unit value, and a market participant identifier. The plurality of attributable interest messages are grouped according to their per unit value prior to broadcast, thus forming a plurality of price group levels.

One or more of the following features may be included. The message feed further includes a group aggregate value for each of the plurality of price group levels.

One or more advantages can be provided from the above. The market participant can easily monitor all trading activity for a specific security. Further, the market participant can quickly determine the total exposure that a particular market participant has concerning that security. Further, selecting blocks of securities is simplified via a group selection process. By providing the user with trade data concerning the security being monitored, the user is better able to judge the condition of the market concerning that specific security.

DETAILED DESCRIPTION

Figure 1:
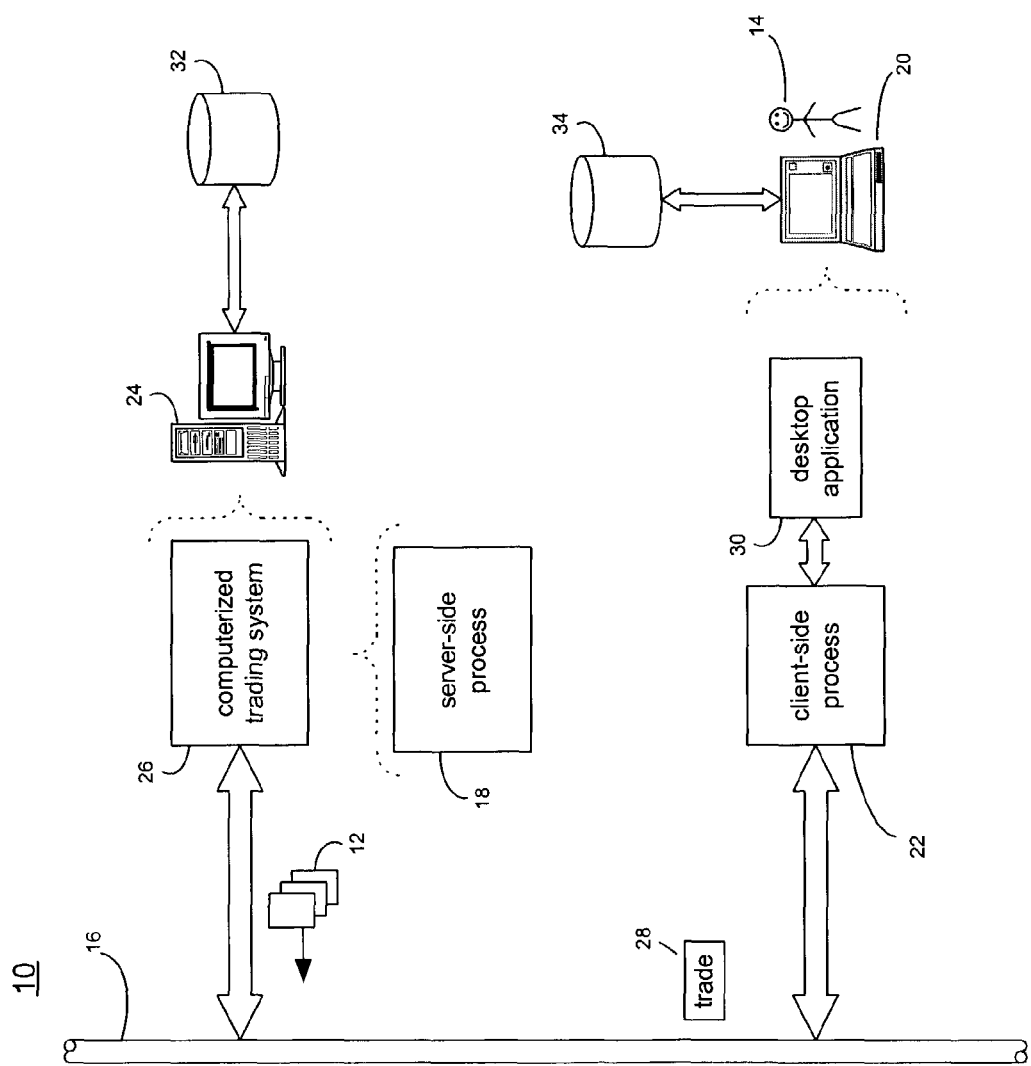
FIG. 1 is a block diagram of an interest dissemination system.

Referring to FIG. 1, there is shown a system 10 for disseminating attributable interest messages 12, in the form of a message feed, to market participants 14. These messages 12, which are processed and broadcast onto a distributed computing network/bus 16 by a server-side process 18, are accessible by market participants 14 though a computer 20 running a client-side process 22. Attributable interest messages 12 specify, for a specific security, the outstanding orders and quotes attributed to the market participants who placed them. This quote and order information is grouped by bid/ask price and processed so that only a defined number of price groups or levels are displayed, thus allowing a market participant to easily discern the market condition of the particular security, and the respective interest and exposure of each market participant.

Server-side process 18 resides on a server 24 that is connected to network/bus 16 (e.g., the Internet, an intranet, a local area network, some other form of network, a data bus, a system bus, etc.). Computerized trading system 26, which trades securities electronically and also resides on server 24, processes trades 28 entered by market participants 14. Market participant 14 typically accesses and uses computerized trading system 26 and client-side process 22 via a desktop application 30 (e.g., Microsoft Internet Explorer™, Netscape Navigator™ or other types of applications such as the Nasdaq Workstation II™, a specialized desktop interface, etc.) running on computer 20, thus allowing market participant 14 to trade securities with other market participants (not shown).

The instruction sets and subroutines of server-side process 18 are typically stored on a storage device 32 connected to server 24. Additionally, computerized trading system 26 stores all information relating to securities trades on storage device 32. Storage device 32 can be a hard disk drive, a tape drive, an optical drive, a RAID array, a random access memory (RAM), or a read-only memory (ROM), for example.

The instruction sets and subroutines of client-side process 22 are typically stored on a storage device 34, such as a hard disk drive, connected to computer 20.

Server 24 includes at least one central processing unit (not shown) and main memory system (not shown). Typically, server 24 is a multi-processing, fault-tolerant system that includes multiple central processing units that each have a dedicated main memory system or share a common main memory pool. While being executed by the central processing unit(s) of server 24, server-side process 18 resides in the main memory system of server 24. Further, the processes and subroutines of server-side process 18 may also be present in various levels of cache memory incorporated into server 24.

Figure 2:
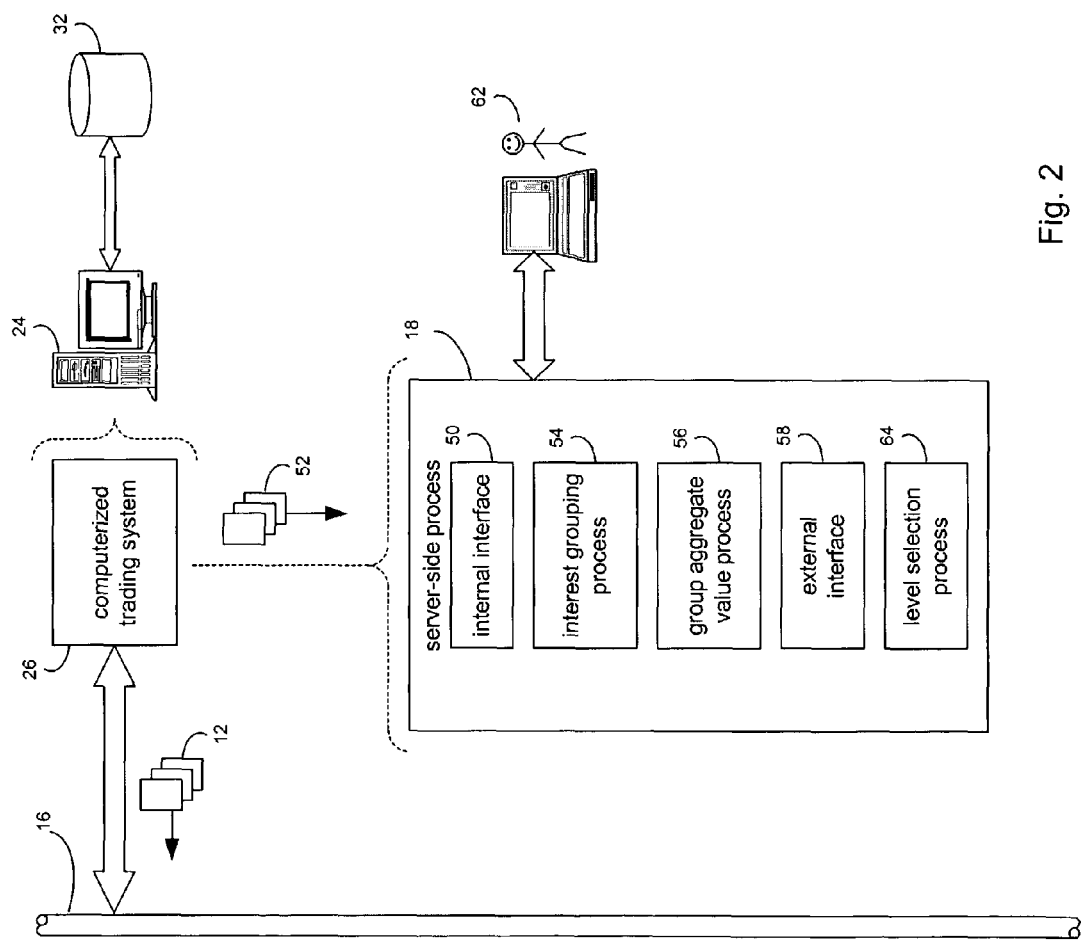
FIG. 2 is a block diagram of a server-side process of the interest dissemination system.

Referring to FIG. 2, server side process 18 includes an internal interface 50 that receives attributable interest messages 52 from computerized trading system 26. These attributable interest messages 52, which concern a specific security that is traded on trading system 26, define the outstanding orders and quotes related to that specific security. For example, if Market Participant A wished to buy one-hundred shares of XYZ Corp. at $42.02 per share, trading system 26 would provide a attributable interest message concerning this outstanding order to server-side process 18. Additionally, if Market Participant B was willing to buy one hundred shares of XYZ Corp. for $40.00 per share and willing to sell 50 shares of XYZ Corp. for $42.03 per share, trading system 26 would provide an attributable interest message concerning this outstanding quote to server-side process 18.

These attributable interest messages 52 received by internal interface 50 define orders (i.e., either an offer to sell or a bid to buy) or quotes (i.e., an other to sell and a bid to buy). Each attributable interest message defines the market participant who is either offering to sell or bidding to buy the security, a lot size (i.e., quantity offered for sale or sought for purchase), and a per unit value (i.e., the offered price or bid value).

Once these attributable interest messages 52 are received by internal interface 50, they are grouped in accordance with their per unit value (i.e., their share price). These attributable interest messages may be ask-side interest messages (for sell orders), or bid-side interest messages (for buy orders). During the trading day, computerized trading system 26 trades securities. During the course of the day, the trade value of the security will vary as market conditions fluctuate. Whenever a market participant is offering a security for sale at the same price that another market participant is willing to pay for the security, a trade occurs between those two market participants. However, if the highest bid to buy is lower than the lowest offer to sell, the security will not be traded.

For example, assume that the total number of shares of XYZ Corp. offered for sale by the individual market participants trading on computerized trading system 26 are as follows:

|  | Ask Price | Lot Size | Market Participant |
|---|---|---|---|
| Offer 1 | $17.10 | 92 | D |
| Offer 2 | $17.31 | 50 | M |
| Offer 3 | $17.31 | 111 | H |
| Offer 4 | $17.31 | 999 | D |
| Offer 5 | $17.35 | 1 | Z |
| Offer 6 | $17.35 | 1 | E |
| Offer 7 | $17.40 | 50 | D |
| Offer 8 | $18.09 | 1 | C |
| Offer 9 | $18.09 | 4 | A |
| Offer 10 | $18.11 | 1 | U |
| Offer 11 | $18.12 | 1 | G |
| Offer 12 | $18.13 | 1 | K |

An attributable interest message 52, would be generated by computerized trading system 26 for each of these outstanding offers to sell. Notice that there are a total of ninety-two shares available at $17.10; eleven-hundred-sixty shares available at $17.31; two shares available at $17.35; fifty shares available at $17.40; five shares available at $18.09; one share available at $18.11; one share available at $18.12; and one share available at $18.13.

Further, assume that the total number of shares of XYZ Corp. sought for purchase by the individual market participants trading on computerized trading system 26 are as follows:

|  | Bid Price | Lot Size | Market Participant |
|---|---|---|---|
| Bid 1 | $17.09 | 10 | A |
| Bid 2 | $17.08 | 10 | C |
| Bid 3 | $17.08 | 999 | L |
| Bid 4 | $17.00 | 1 | G |
| Bid 5 | $17.00 | 1 | Z |
| Bid 6 | $17.00 | 1 | M |
| Bid 7 | $17.00 | 1 | R |
| Bid 8 | $16.95 | 1 | A |
| Bid 9 | $16.73 | 1 | L |
| Bid 10 | $16.61 | 5 | Q |
| Bid 11 | $16.44 | 1 | Z |
| Bid 12 | $16.11 | 5 | P |

An attributable interest message 52 would be generated by computerized trading system 26 for each of these outstanding bids to buy. Notice that there are a total of ten shares sought for purchase at $17.09; one-thousand-nine shares sought for purchase at $17.08; four shares sought for purchase at $17.00; one share sought for purchase at $16.95; one share sought for purchase at $16.73; five shares sought for purchase at $16.61; one share sought for purchase at $16.44; and five shares sought for purchase at $16.11. Since the highest bid price is $17.09 and the lowest ask price is $17.10, no trades of XYZ Corp. will occur until either Market Participant A raises their bid to $17.10 or Market Participant D lowers their ask price to $17.09. This once cent price difference is commonly referred to as the "spread".

As stated above, when attributable interest messages 52 are received by internal interface 50, they are grouped in accordance with their bid/ask prices by an interest grouping process 54. This provides multiple price groups that are either associated with outstanding offers to sell or outstanding bids to buy. Concerning each of these price groups, a group aggregate value process 56 calculates the total number of shares available at that price. Continuing with the above-stated example, the group aggregate value for each price group would be as follows:

| | Ask-Side Price Groups or Offers to Sell XYZ Corp. | |
|---|---|---|
| Group # | Unit Price | Group Aggregate Value |
| Group 1 | $17.10 | 92 |
| Group 2 | $17.31 | 1160 |
| Group 3 | $17.35 | 2 |
| Group 4 | $17.40 | 50 |
| Group 5 | $18.09 | 5 |
| Group 6 | $18.11 | 1 |
| Group 7 | $18.12 | 1 |
| Group 8 | $18.13 | 1 |

| | Bid-Side Price Groups for Bids to Buy XYZ Corp. | |
|---|---|---|
| Group # | Unit Price | Group Aggregate Value |
| Group 1 | $17.09 | 10 |
| Group 2 | $17.08 | 1009 |
| Group 3 | $17.00 | 4 |
| Group 4 | $16.95 | 1 |
| Group 5 | $16.73 | 1 |
| Group 6 | $16.61 | 5 |
| Group 7 | $16.44 | 1 |
| Group 8 | $16.11 | 5 |

An external interface 58 publishes (or pushes), over network/bus 16, the attributable interest messages included in selected price groups. This results in a message feed 12 being pushed across network/bus 16 that is monitorable by market participants who are using client-side process 22. As shown above, there are eight ask-side price groups and eight bid-side price groups. This is for illustrative purposes only, as there may be less or substantially more price groups depending on market conditions. Typically, the messages included in the first five price groups are published by external interface 54, thus allowing the market participants to determine the market condition and level of market participant exposure for a particular security. For example, assuming that the first five ask-side and bid-side price groups are published by external interface 54, the market participant reviewing these messages will quickly determine that Market Participant D it comparatively trying to sell a substantial number of shares of XYZ Corp, namely ninety-two shares at $17.10, nine-hundred-ninety-nine shares at $17.31, and fifty shares at $17.40. Additionally, Market Participant D is not trying to buy any shares of XYZ Corp.

The specific price groups from which the attributable interest messages are published, is configured by an administrator 62 using a level selection process 64. The best ask-side and bid-side price group is always published and, as stated above, typically the messages from the next four bid-side and the next four ask-side groups are also published. Alternatively, the market participant 14 using client-side process 22 may be able to specify the number of groups to be published.

Figure 3:
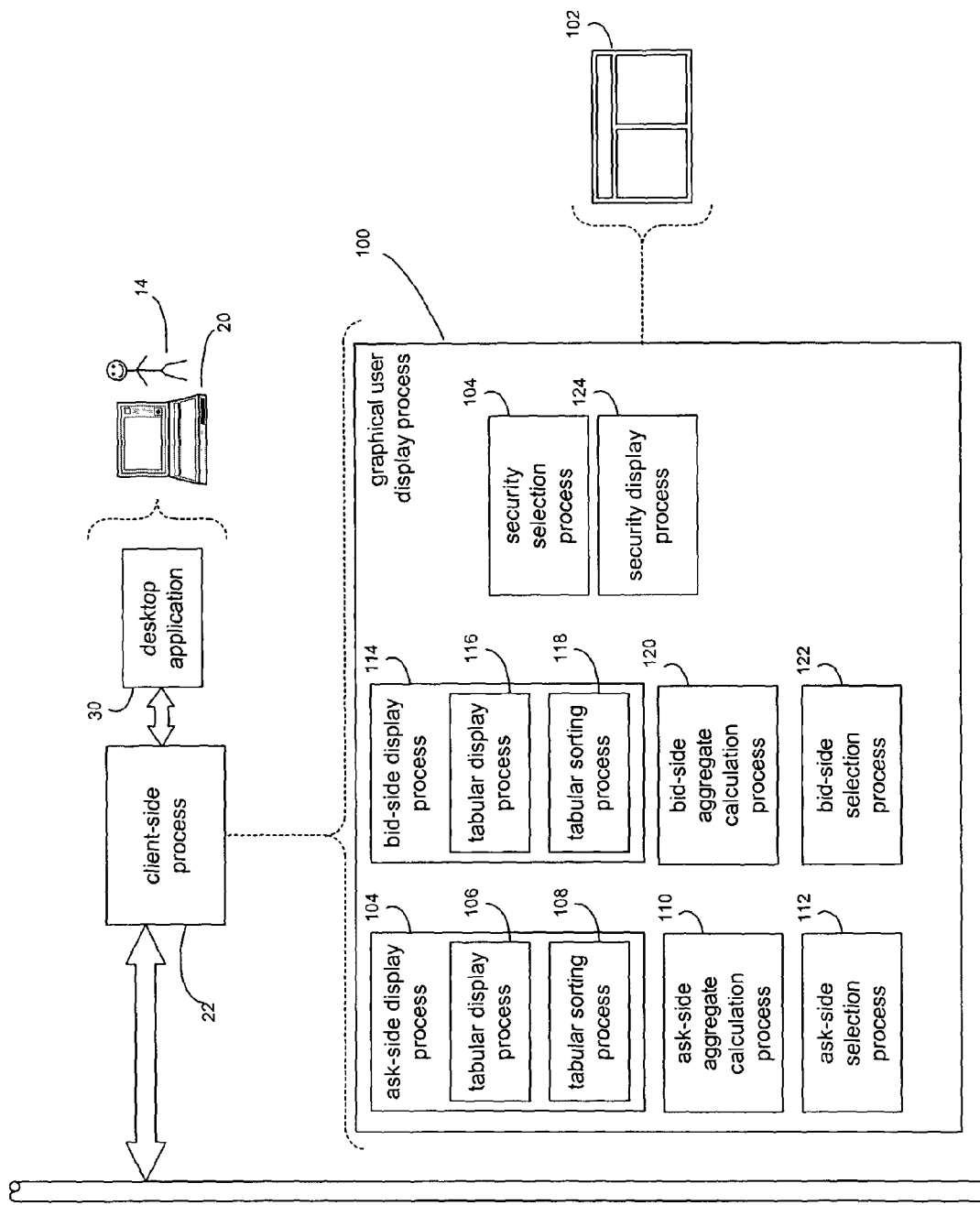
FIG. 3 is a block diagram of a client-side process of the interest dissemination system.

Referring to FIG. 3, a client-side process 22 includes a graphical user display process 100 that displays the attributable interest messages and group aggregate values published by external interface 58. The client-side process 22 receives message feed 12, which is published by external interface 58 and includes messages pertaining to a selected number of ask-side and bid-side price groups.

Graphical user display process 100 allows a market participant 14 to monitor the trading activity for a specific security traded on computerized trading system 26, by providing market participant 14 with a summarized display 102 (to be discussed below in greater detail) viewable on computer 20. Typically, summarized display 102 is one screen in size, thus allowing market participant 14 to quickly get an overview of the activity of the specific security without having to scroll through or toggle between multiple screens.

Graphical user display process 100 includes a security selection process 104 that allows market participant 14 to select the specific security they wish to monitor. This selection may occur is several different ways and will vary depending on the manner in which selection process 104 is implemented. For example, market participant 14 may select the security they wish to monitor via a drop-down menu that allows the market participant to scroll through a list of securities and select the one they wish to monitor. This drop down menu may use ticker symbols or may list the full name of the issuer of the security. Alternatively, market participant 14 may wish to enter the security's ticker symbol directly, thus allowing for quicker selection.

Once market participant 14 selects the security, client-side process 22 connects to the appropriate feed that is associated with that security. Typically, summarized display 102 is a real-time display, in that the information shown within the display is regularly updated in accordance with the rate that external interface 58 broadcasts the attributable interest messages encoded within message feed 60.

Figure 4:
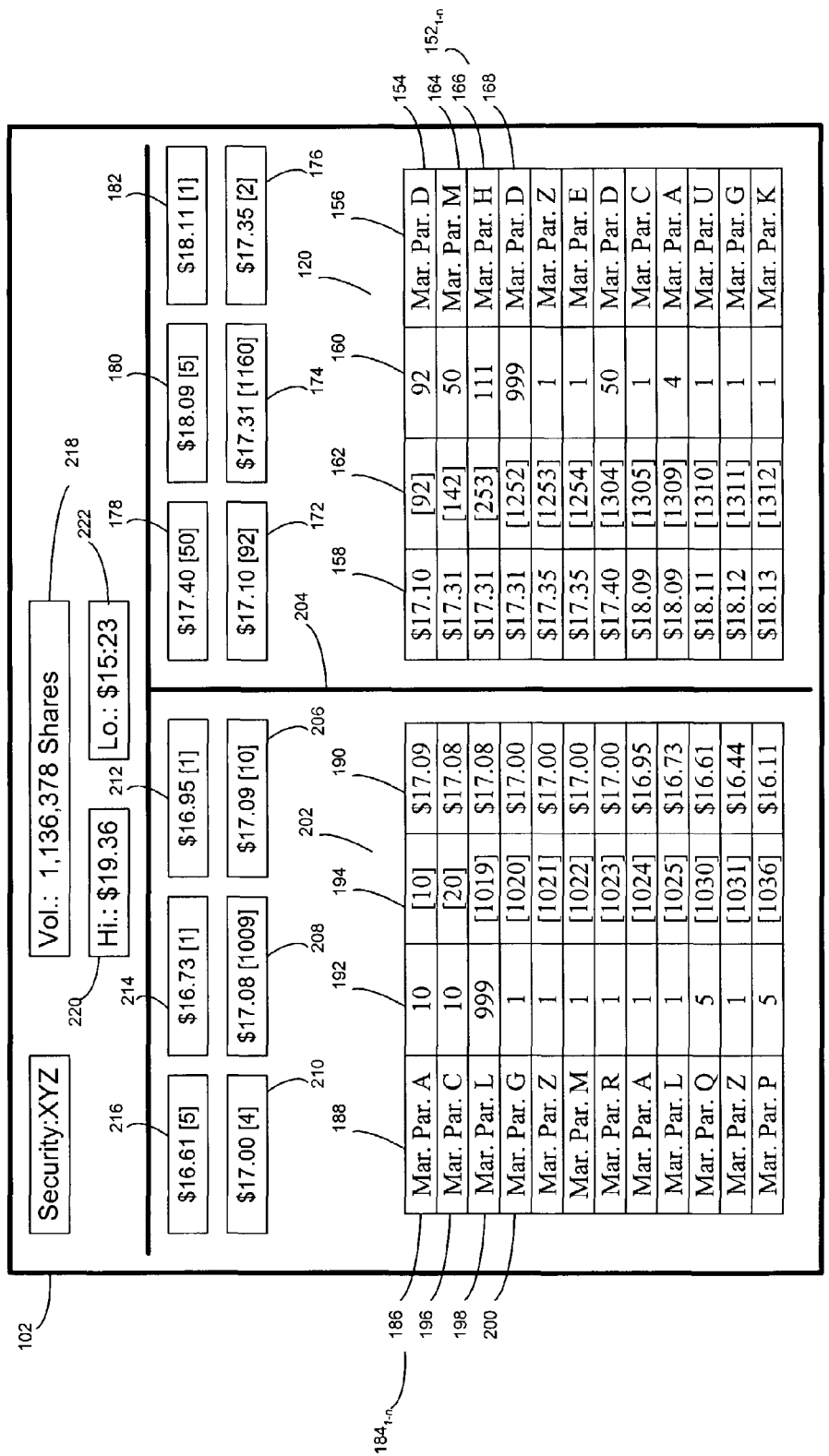
FIG. 4 is a diagrammatic view of a summarized display.

Referring to FIG. 4, an ask-side display process 104 displays, in a multi-column format, an ask-side entry $152_{1-n}$ for each attributable interest message received that is an ask-side interest message. Each discrete ask-side entry $152_{1-n}$ represents a discrete group of the specific security selected by market participant 14, such that these groups of securities are being offered for sale by another market participant and the specifics of the ask-side entry correspond to the ask-side interest message received. For example, ask-side entry 154 concerns a group of ninety-two shares of the security XYZ Corp. that is currently being offered for sale by Market Participant D for $17.10 per share.

Ask-side entry 154 includes multiple columns, each of which provides information concerning the discrete group of securities being offered for sale, such as a market participant identifier 156 (i.e., a unique symbol that identifies the market participant who is offering the security for sale), an ask price 158, a lot size 160 (i.e., the quantity of shares of the selected security available at that ask price from that market participant), and an aggregate value 162 (i.e., the total sum of shares available at that price or lower).

Ask-side display process 104 includes a tabular display process 106 for simultaneously displaying multiple ask-side entries (e.g., ask-side entries 152, 164, 166, 168). These ask-side entries are arranged vertically so that the market participant identifier, ask price, lot size, and aggregate value of each entry are aligned, providing ask-side table 170.

Therefore, for this particular summarized display 102, if a market participant 14 is willing to pay up to $17.10 for a share of XYZ Corp., market participant 14 could buy up to ninety-two shares from Market Participant D. This is shown in ask-side entry 154. However, if market participant 14 desires a ninety-third share of XYZ Corp., market participant 14 is going to have to pay $17.31 for that one additional share, since Market Participant D only has ninety-two shares for sale at $17.10 and the additional share is going to have to be purchased from Market Participant M for $17.31 (see ask-side entry 164). If, upon realizing that additional shares of XYZ corp. can be purchased for $17.31, market participant 14 wishes to purchase an additional one-hundred shares of XYZ corp., Market Participant M has fifty shares of XYZ Corp. for sale for $17.31, Market Participant H has an additional one-hundred-eleven shares available for $17.31, and Market Participant D has nine-hundred-ninety-nine shares available for $17.31. Therefore, a total of eleven-hundred-sixty shares of XYZ Corp. are available for $17.31. This corresponds to the group aggregate value calculated for this price group of shares by the group aggregate value process 56 incorporated into server-side process 18.

Display process 100 includes an ask-side aggregate calculation process 110 for calculating the ask-side aggregate value 162 for each ask-side entry (as opposed to a group of entries). Ask-side aggregate calculation process 110 determines the ask-side aggregate value 162 for a particular ask-side entry by summing the value of the lot size for that particular ask-side entry with the lot sizes of all preceding ask-side entries included in ask-side table 170. For example, the aggregate value for ask-side entry 154 is [92], the aggregate value for ask-side entry 164 is [142, i.e., 92+50], the aggregate value for ask-side entry 166 is [253, i.e., 92+50+111], and so forth.

A tabular sorting process 108 sorts ask-side entries (e.g., 154, 164, 166, 168) in accordance with a user-defined sorting parameter, such as ascending or descending ask prices, alphanumeric market participant ID's, ascending or descending lot sizes, for example. This enables market participant 14 to group and order the ask-side entries within ask-side table 170 in accordance with their personal preferences. For example, it market participant 14 wanted to know which groups of securities a particular market participant was offering for sale, market participant 14 could sort the ask-side entries by market participant. However, the ask-side entries within ask-side table 170 are typically sorted by ask price (as shown in FIG. 4).

An ask-side selection process 112 allows a market participant 14 to select (typically for purchase) groups of ask-side entries that have a common ask price. In order to facilitate this user selection, summarized display 102 includes group selection buttons 172, 174, 176, 178, 180, 182 that are each are assigned to a particular ask price and, therefore, correspond to a particular price group level (as sorted by the interest grouping process 54 of server-side process 18). These buttons are dynamically updated by ask-side selection process 112 so that they accurately reflect the securities (e.g., XYZ Corp.) currently offered for sale on computerized trading system 26. For example, group selection button 172 represents shares of XYZ corp. available for $17.10. As discussed above, there are ninety-two of them, as represented by ask-side entry 154. Group selection button 174 represents shares of XYZ Corp. available for $17.31. There are eleven-hundred-sixty of them, as represented by ask-side entries 164, 166, 168. In summary, each of these buttons represent a group of securities (as grouped by interest grouping process 54) that are offered at a common ask price, such that each of these buttons specifies the total number of shares available (as calculated by group aggregate value process 56) at that common ask price.

By clicking on or otherwise selecting (with a mouse or other pointing device, not shown) any of these group selection buttons, market participant 14 can select groups of shares available at a particular ask price. As stated above, these buttons are dynamically updated, so that if ask-side entry 154 is sold (i.e., purchased by another Market Participant), there would be no more shares of XYZ Corp. available for $17.10 and, therefore, group selection button 172 would be removed by ask-side selection process 112. Further, assuming that no additional shares of XYZ Corp. became available at a price lower than $17.31, an additional group selection button (not shown) would be produced that would indicate one share of XYZ Corp. being available from Market Participant G for $18.12. Typically, group selection buttons 172, 174, 176, 178, 180, 182 are organized so that the ask price that each button is associated with increases as market participant 14 moves along any row of buttons from left to right.

In a manner similar to ask-side display process 104, a bid-side display process 114 displays, in a multi-column format, a bid-side entries 184$_{1-n}$ for each attributable interest message received that is a bid-side interest message for the same security (i.e., XYZ Corp.) selected by market participant 14. Each discrete bid-side entry 184$_{1-n}$ represents a discrete group of the specific security (selected by market participant 14) that is sought for purchase by another market participant of computerized trading system 26, such that the specifics of the bid-side entry correspond to the bid-side interest message received. For example, bid-side entry 186 concerns a group of ten shares of the security XYZ Corp. that a market participant (i.e., Market Participant A) currently wants to purchase. Similar to an ask-side entry, a bid-side entry 186 includes multiple columns, each of which provides information concerning the discrete group of securities sought for purchase, such as a market participant identifier 188 (i.e., a unique symbol that identifies the market participant who wants to purchase the security), a bid price 190, a lot size 192 (i.e., the quantity of shares of the selected security wanted for purchase by that market participant at that bid price), and an aggregate value 194 (i.e., the total sum of shares wanted for purchase at that price or higher).

Bid-side display process 114 includes a tabular display process 116 for simultaneously displaying multiple bid-side entries (e.g., bid-side entries 186, 196, 198, 200). These bid-side entries are arranged vertically so that the market participant identifier, bid price, lot size, and aggregate value of each entry are aligned, forming an bid-side table 202.

Therefore, for this particular summarized display 102, if market participant 14 owns two-thousand shares of XYZ corp. that they are willing to sell but they do not want to sell them for less than $17.09 per share, market participant 14 can only sell ten shares to Market Participant A, as bid-side entry 186 specifies that $17.09 is the highest dollar amount offered to buy a share of XYZ Corp. and Market Participant A is only willing to purchase ten shares at that price. However, if market participant 14 is willing to lower their sell price to $17.08 per share, market participant 14 can sell one-thousand-nineteen shares of XYZ corp. at that price. Specifically, Market Participant A is willing to buy ten shares for $17.09 (see bid-side entry 186), Market Participant C is willing to buy ten shares for $17.08 (see bid-side entry 196), and Market Participant L is willing to buy nine-hundred-ninety-nine shares for $17.08 (see bid-side entry 198).

Display process 100 includes an bid-side aggregate calculation process 120 for calculating the bid-side aggregate value 194 for each bid-side entry. As with ask-side aggregate calculation process 110, bid-side aggregate calculation process 120 determines the bid-side aggregate value 194 for a particular bid-side entry by summing the value of the lot size for that particular bid-side entry with the lot sizes of all preceding bid-side entries included in bid-side table 202. For example, the aggregate value for bid-side entry 186 is [10], the aggregate value for bid-side entry 196 is [20, i.e., 10+10], the aggregate value for bid-side entry 198 is [1019, i.e., 10+10+999], and so forth.

Similar to that of ask-side entries, a tabular sorting process 118 sorts bid-side entries (e.g., 186, 196, 198, 200) in accordance with a user-defined sorting parameter, such as ascending or descending bid prices, alphanumeric market participant ID's, ascending or descending lot sizes, etc. This enables market participant 14 to group and order the bid-side entries within bid-side table 202 in accordance with their personal preferences. Again, like ask-side table 170, bid-side entries within bid-side table 202 are typically sorted by bid price (as shown in FIG. 4).

Bid-side display process 114 displays bid-side entries so that bid-side table 202 is essentially a mirror image of ask-side table 170. Specifically, the columns in bid-side table 202 are arranged so that they are in the opposite order (i.e., when moving across the tables 170, 202 in a common direction) to that of ask-side table 170. The columns of these tables are essentially mirrored around an imaginary centerline 204. For example, column 158 and column 190 (i.e., ask prices and bid prices respectively) are the closest columns to centerline 204. Column 162 and column 194 (i.e., ask-side and bid-side aggregate values respectively) are the second closest columns to centerline 204. Further, column 160 and column 192 (i.e., ask-side and bid-side lot sizes respectively) are the third closest columns to centerline 204. And finally, column 156 and column 188 (i.e., ask-side and bid-side market participant ID's respectively) are the furthest columns away from centerline 204.

A bid-side selection process 122 allows a market participant 14 to select (typically for the purpose of selling the market participant's securities) groups of bid-side entries that have a common bid price. In order to facilitate this user selection, summarized display 102 includes group selection buttons 206, 208, 201, 212, 214, 216 that each are assigned to a particular bid price. The buttons are dynamically updated by bid-side selection process 122 so that they accurately reflect the securities currently sought for purchase. For example, group selection button 206 represents shares sought for purchase at $17.09. As discussed above, there are ten of them, as represented by bid-side entry 186. Group selection button 208 represents shares available for $17.08. There are one-thousand-nine of them, as represented by bid-side entries 196, 198. In summary, each of these buttons represent a group of securities (as grouped by interest grouping process 54) that are sought for purchase at a common bid price, such that each of these buttons specifies the total number of shares sought (as calculated by group aggregate value process 56) at that common bid price.

By clicking on or otherwise selecting (with a mouse or other pointing device, not shown) any of these group selection buttons, market participant 14 can select groups of shares that the other market participant (i.e., the market participant who owns the bid-side entry) wishes to purchase for a particular bid price.

These buttons are also dynamically updated, so that if bid-side entry 186 is filled (i.e., someone else sold Market Participant A ten shares of XYZ corp. for $17.09 per share), there would be no more market participants willing to pay $17.09 for a share of XYZ corp. and, therefore, group selection button 206 would be removed by bid-side selection process 122. Further, assuming that no other market participants were willing to pay more than $17.08 for a share of XYZ corp., an additional group selection button (not shown) would be created that would indicate that a market participant (i.e., Market Participant Z) was willing to pay $16.44 for one share of XYZ corp. Typically, group selection buttons 206, 208, 210, 212, 214, 216 are organized so that the bid price that each button is associated with decreases as market participant 14 moves along any row of buttons from right to left, an arrangement that is a mirror image of the ask-side group selection buttons (i.e., 172, 174, 176, 178, 180, 182).

A security display process 124 displays, in summarized display 102, pertinent trade data relating to the specific security (e.g., XYZ Corp.) being monitored by market participant 14. Examples of this pertinent trade data, which is retrieved from computerized trading system 26, include a daily trade volume amount indicator 218, a daily high trade amount indicator 220, and a daily low trade value amount indicator 222.

While the group selection buttons are shown arranged in groups of six, this is an arbitrary amount, as this number can be adjusted depending on the requirements of market participant 14 and/or administrator 62. Typically the number of group selection button displayed is equal to the number of price group levels published by external interface 58 (typically five).

While the lot sizes 160, 192 described above are stated to be in units of shares, it is possible for these numbers to also represent groups of one-hundred shares (commonly referred to as "round lots"), or any other amount of shares. In this scenario, ask-side entry 154 may represent an offer to sell ninety-two-hundred shares of XYZ corp.

While imaginary centerline 204 is shown as being a vertical centerline, this imaginary centerline 204 may be a horizontal centerline, such that ask-side and bid-side entries are arranged in multi-row format and, therefore, mirroring would occur about a horizontal axis.

While server-side process 18 is described above as being configured to publish a message feed 12 that is presorted (i.e., filtered) such that the attributable interest messages in the feed concern only a single security, other arrangements are possible. For example, the message feed may broadcast all attributable interest messages (regardless of the specific security they pertain to) and client-side process 22 could filter these message so that ask-side and bid-side entries are created for only messages pertaining to a single security.

Figure 5:
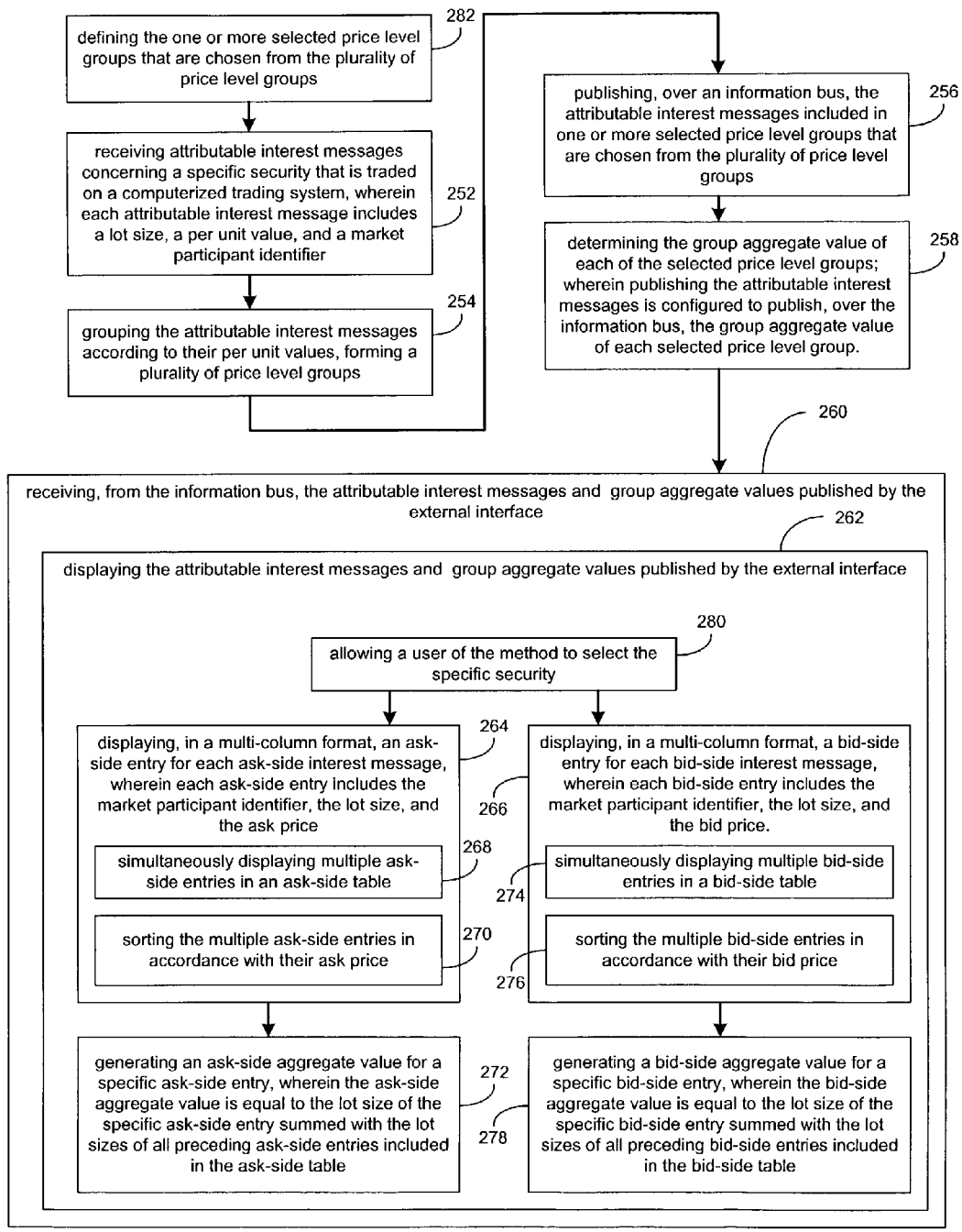
FIG. 5 is a flow chart of an interest dissemination process.

Referring to FIG. 5, there is shown a process 250 for disseminating attributable interest information. Attributable interest messages are received 252 concerning a specific security that is traded on a computerized trading system. Each attributable interest message includes a lot size, a per unit value, and a market participant identifier. These messages are grouped 254 according to their per unit values, thus forming a plurality of price level groups. The attributable interest messages included in one or more selected price level groups, which are chosen from the plurality of price level groups, are published 256 over an information bus.

The group aggregate value of each of the selected price level groups is determined 258, and these group aggregate values are published over the information bus. The attributable interest messages and the group aggregate values that were published by the external interface are received 260 from the information bus. Receiving 260 the attributable interest messages includes displaying 262 the attributable interest messages and group aggregate values published by the external interface. The attributable interest messages include ask-side interest messages that represent a lot size of the specific security that is offered for sale by a market participant at an ask price, such that the ask price is equivalent to the per unit value. The attributable interest messages also include bid-side interest messages that represent a lot size of the specific security that is sought for purchase by a market participant at a bid price, such that the bid price is equivalent to the per unit value. Displaying 262 the attributable interest messages includes displaying 264, in a multi-column format, an ask-side entry for each ask-side interest message. Each ask-side entry includes the market participant identifier, the lot size, and the ask price. Further, displaying 262 the attributable interest messages includes displaying 266, in a multi-column format, a bid-side entry for each bid-side interest message, such that each bid-side entry includes the market participant identifier, the lot size, and the bid price.

Displaying 264 an ask-side entry includes displaying 268 multiple ask-side entries in an ask-side table, and sorting 270 the multiple ask-side entries in accordance with their ask price. An ask-side aggregate value is generated 272 for a specific ask-side entry, such that the ask-side aggregate value is equal to the lot size of the specific ask-side entry summed with the lot sizes of all preceding ask-side entries included in the ask-side table.

Displaying 266 a bid-side entry includes displaying 274 multiple bid-side entries in a bid-side table, and sorting 276 the multiple bid-side entries in accordance with their bid price. A bid-side aggregate value is generated 278 for a specific bid-side entry, such that the bid-side aggregate value is equal to the lot size of the specific bid-side entry, summed with the lot sizes of all preceding bid-side entries included in the bid-side table.

Displaying 262 the attributable interest messages includes allowing 280 a user of the method to select the specific security. The one or more selected price level groups that are chosen from the plurality of price level groups are defined 282. The attributable interest messages include quotes, and orders.

The system described herein is not limited to the hardware embodiment described above; it may find applicability in any computing or processing environment. The system may be implemented in hardware, software, or a combination of the two. For example, the system may be implemented using circuitry, such as one or more of programmable logic (e.g., an ASIC), logic gates, a processor, and a memory.

The system may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system may also be implemented as a machine-readable storage medium, configured with a computer program, where, upon execution, instructions in the computer program cause a machine to operate to perform the functions of the system described above.

Embodiments of the system may be used in a variety of applications. Although the system is not limited in this respect, the system may be implemented with memory devices in microcontrollers, general purpose microprocessors, digital signal processors (DSPs), reduced instruction-set computing (RISC), and complex instruction-set computing (CISC), among other electronic components.

Embodiments of the system may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A system to disseminate attributable interest information, the system comprising:
    a processor;
    memory coupled to the processor;
    an internal interface coupled to the processor, the internal interface receiving attributable interest messages concerning a specific security that is traded on a trading system, wherein each attributable interest message includes a lot size, a per unit value, and a market participant identifier;
    a computer readable medium storing a computer program product for processing the attributable interest messages, the computer program product comprising instructions to cause the processor to:
    group the attributable interest messages according to their per unit values;
    form a plurality of price level groups;
    generate an ask-side aggregate value for a specific ask-side entry, wherein the ask-side aggregate value is equal to the lot size of the specific ask-side entry summed with the lot sizes of all preceding ask-side entries;
    generate a bid-side aggregate value for a specific bid-side entry, wherein the bid-side aggregate value is equal to the lot size of the specific bid-side entry summed with the lot sizes of all preceding bid-side entries; and
    determine a group aggregate value of each of one or more selected price level groups that are chosen from the plurality of price level groups, the ask-side aggregate value, and the bid-side aggregate value; and
    an external interface for publishing the attributable interest messages included in the one or more selected price level groups.

2. The system of claim 1, wherein the external interface is configured to publish the group aggregate value of each selected price level group.

3. The system of claim 2 further comprising:
    a client computer system to receive the attributable interest messages and the group aggregate values published by the external interface.

4. The system of claim 3 wherein the client system comprises a display device to render the attributable interest messages and the group aggregate values published by the external interface.

5. The system of claim 4 wherein the attributable interest messages include:
    ask-side interest messages that represent a lot size of the specific security that is offered for sale by a market participant at an ask price, wherein the ask price is equivalent to the per unit value; and
    bid-side interest messages that represent a lot size of the specific security that is sought for purchase by a market participant at a bid price, wherein the bid price is equivalent to the per unit value.

6. The system of claim 5 wherein the client system:
    renders on the display device, in a multi-column format, an ask-side entry for each ask-side interest message, wherein each ask-side entry includes the market participant identifier, the lot size, and the ask price; and
    renders on the display device, in a multi-column format, a bid-side entry for each bid-side interest message, wherein each bid-side entry includes the market participant identifier, the lot size, and the bid price.

7. The system of claim 6 wherein the client system renders on the display device a simultaneous display of multiple ask-side entries in an ask-side table.

8. The system of claim 7 wherein the client system sorts the multiple ask-side entries in accordance with their ask price.

9. The system of claim 6 wherein the client system renders on the display device a simultaneous display of multiple bid-side entries in a bid-side table.

10. The system of claim 9 wherein the client system sorts the multiple bid-side entries in accordance with their bid price.

11. The system of claim 4 wherein the client system allows a user of the system to select the specific security.

12. The system of claim 6 wherein the client system defines the one or more selected price level groups that are chosen from the plurality of price level groups.

13. The system of claim 1 wherein the attributable interest messages include: quotes and orders.

14. A computer-implemented method of disseminating attributable interest information comprising:
    receiving, over an internal interface of a programmed computer system, attributable interest messages concerning a specific security that is traded on a computerized trading system, wherein each attributable interest message includes a lot size, a per unit value, and a market participant identifier;
    grouping, by the programmed computer system, the attributable interest messages according to their per unit values, forming a plurality of price level groups, further comprising:

generating, by the programmed computer system, an ask-side aggregate value for a specific ask-side entry, wherein the ask-side aggregate value is equal to the lot size of the specific ask-side entry summed with the lot sizes of all preceding ask-side entries;

generating, by the programmed computer system, a bid-side aggregate value for a specific bid-side entry, wherein the bid-side aggregate value is equal to the lot size of the specific bid-side entry summed with the lot sizes of all preceding bid-side entries;

determining, by the programmed computer system, a group aggregate value of each of one or more selected price level groups chosen from the plurality of price groups; and publishing, over an information bus, the attributable interest messages included in the one or more selected price level groups that are chosen from the plurality of price level groups.

15. The method of claim 14 wherein the publishing includes publishing the group aggregate value of each selected price level group.

16. The method of claim 15 further comprising:
receiving, from the information bus, the attributable interest messages and the group aggregate values published by the external interface.

17. The method of claim 16 wherein receiving the attributable interest messages includes rendering on a display device, the attributable interest messages and the group aggregate values published by the external interface.

18. The method of claim 17 wherein the attributable interest messages include:
ask-side interest messages that represent a lot size of the specific security that is offered for sale by a market participant at an ask price, wherein the ask price is equivalent to the per unit value; and
bid-side interest messages that represent a lot size of the specific security that is sought for purchase by a market participant at a bid price, wherein the bid price is equivalent to the per unit value.

19. The method of claim 18 wherein displaying the attributable interest messages includes:
displaying, in a multi-column format, an ask-side entry for each ask-side interest message, wherein each ask-side entry includes the market participant identifier, the lot size, and the ask price; and
displaying, in a multi-column format, a bid-side entry for each bid-side interest message, wherein each bid-side entry includes the market participant identifier, the lot size, and the bid price.

20. The method of claim 19 wherein displaying an ask-side entry includes rendering on the display device a simultaneous display of multiple ask-side entries in an ask-side table.

21. The method of claim 20 wherein displaying an ask-side entry includes sorting the multiple ask-side entries in accordance with their ask price.

22. The method of claim 21 wherein displaying a bid-side entry includes rendering on the display device a simultaneous display of multiple bid-side entries in a bid-side table.

23. The method of claim 22 wherein displaying a bid-side entry includes sorting the multiple bid-side entries in accordance with their bid price.

24. The method of claim 14 wherein displaying the attributable interest messages includes allowing a user of the method to select the specific security.

25. The method of claim 14 further including defining the one or more selected price level groups that are chosen from the plurality of price level groups.

26. The method of claim 14 wherein the attributable interest messages include: quotes and orders.

27. A computer program product residing on a non-transitory, computer-readable medium having a plurality of instructions stored thereon which, when executed by a processor, cause that processor to:
receive attributable interest messages concerning a specific security that is traded on a computerized trading system, wherein each attributable interest message includes a lot size, a per unit value, and a market participant identifier;
group the attributable interest messages according to their per unit values, forming a plurality of price level groups, further comprising instructions to:
generate an ask-side aggregate value for a specific ask-side entry, wherein the ask-side aggregate value is equal to the lot size of the specific ask-side entry summed with the lot sizes of all preceding ask-side entries;
generate a bid-side aggregate value for a specific bid-side entry, wherein the bid-side aggregate value is equal to the lot size of the specific bid-side entry summed with the lot sizes of all preceding bid-side entries;
determine a group aggregate value of each of one or more selected price level groups that are chosen from the plurality of price level group;
publish, over an information bus, the attributable interest messages included in one or more selected price level groups that are chosen from the plurality of price level groups.

28. The computer program product of claim 27 further comprising instructions to cause the processor to
publish, over the information bus, the group aggregate value of each selected price level group.

29. The computer program product of claim 28 further comprising instructions to cause the processor to receive, from the information bus, the attributable interest messages and the group aggregate values published over the information bus.

30. The computer program product of claim 29 wherein the instructions to receive the attributable interest messages further includes instructions to cause the processor to display the attributable interest messages and the group aggregate values published over the information bus.

31. The system of claim 1, wherein the attributable interest messages are published as a message feed broadcast onto a distributed computing network, with the plurality of attributable interest messages being grouped according to their per unit value prior to broadcast.

32. A computer system comprising:
a processor;
a display device;
main memory coupled to the processor; and
a computer readable medium storing a computer program product, the computer program product comprising instructions to cause the processor to render on the display device:
a graphical user interface to disseminate attributable interest information, the graphical user interface comprising:
a multi-column field that specifies an ask-side entry for each ask-side interest message comprising:
a field that specifies the market participant for the ask-side entry;
a field that specifies an ask price;
a field that specifies a lot size of the ask-side entry; and
a field that specifies the shares of attributable interest available for sale at that price or higher comprising an ask-side aggregate value equal to the lot size of the specific ask-side entry summed with the lot sizes of all preceding ask-side entries; and a multi-column field that specifies a bid-side entry for each bid-side interest message comprising:

a field that specifies the market participant for the bid-side entry;

a field that specifies a bid price;

a field that specifies a lot size of the bid side entry; and a field that specifies the shares of attributable interest available for purchase at that price or lower comprising a bid-side aggregate value equal to the lot size of the specific bid-side entry summed with the lot sizes of all preceding bid-side entries, wherein the graphical user interface further comprises:

a first group of selection buttons updated by the computer system to display the total lot size of attributable interest entries at a common ask price; and a second group of selection buttons updated by the computer system to display the total lot size of attributable interest entries at a common bid price.

33. The computer system of claim 32, wherein the graphical user interface further comprises:

a field that specifies a daily trade volume amount, a field that specifies a daily high trade amount, and a field that specifies a daily low trade value amount.

\* \* \* \* \*